United States Patent [19]
Snyder et al.

[11] Patent Number: 6,070,171
[45] Date of Patent: May 30, 2000

[54] METHOD AND SYSTEM FOR COPY-TRACKING DISTRIBUTED SOFTWARE FEATURING TOKENS CONTAINING A KEY FIELD AND A USAGE FIELD

[75] Inventors: J. Gary Snyder, Frederick, Md.; Peter P. Brooks, Brooklyn, N.Y.; Steven Bliss, Frederick, Md.

[73] Assignees: Palantir Software, Inc., Frederick, Md.; MicroMind, Inc., Brooklyn, N.Y.

[21] Appl. No.: 09/079,381

[22] Filed: May 15, 1998

Related U.S. Application Data

[60] Provisional application No. 60/046,511, May 15, 1997.

[51] Int. Cl.[7] ........................................ G06F 17/30
[52] U.S. Cl. ........................ 707/203; 705/55; 705/59
[58] Field of Search ........................... 707/203; 705/55, 705/59

[56] References Cited

U.S. PATENT DOCUMENTS

| | | | |
|---|---|---|---|
| 5,708,709 | 1/1998 | Rose | 709/59 |
| 5,754,646 | 5/1998 | Williams et al. | 705/55 |
| 5,943,423 | 8/1999 | Muftic | 705/67 |

*Primary Examiner*—Thomas G. Black
*Assistant Examiner*—William Trinh
*Attorney, Agent, or Firm*—James F. Powers, Jr.

[57] ABSTRACT

The present invention provides a central computer site on a computer network for detecting authorized or unauthorized duplication of software on computers connected to such a network. The computers on the network may be continually connected, like computers on a Local Area Network, or intermittently connected, like computers on the Internet. Every time a user of the distributed software attempts to execute that software, a connection to the central computer site on the network is made, and a previously-created information token is presented by the user's software to the central site. The central site evaluates that token, and possibly issues a new token to be kept by the user for the next transaction. These transactions need no human intervention, and may take place without the software user's knowledge. At the same time, the central site may provide or withhold permission for the user to execute the distributed software. Using this information token, the central site can detect when a user uses a copy not made at the factory and track the execution of any such software copies. The central site need not know the identity of those using the software, nor the identities of the computers on which the software is executed.

39 Claims, 4 Drawing Sheets

Information Flow Diagram

Fig. 1: Information Flow Diagram

METHOD AND SYSTEM FOR COPY-TRACKING DISTRIBUTED SOFTWARE FEATURING TOKENS CONTAINING A KEY FIELD AND A USAGE FIELD

CROSS-REFERENCE TO RELATED APPLICATION

This application claims the benefit of U.S. Provisional Application No. 60/046,511, filed May 15, 1997.

BACKGROUND OF THE INVENTION

1. Field of the Invention

The present invention relates to software copy-protection, software copy-tracking, program-to-program network communications, and software execution permission issues.

2. Description of the Prior Art

Software is distributed to software users via floppy disk, CDROM and other media, and electronically over computer networks. Software is particularly easy to copy, and to distribute to unlicensed or unauthorized users.

One of the problems facing software publishers is the control of the number of executable copies made by software users themselves. The software publisher or distributor has many reasons to want to control or track the number of authorized, unauthorized, unintended or user-created copies of his software. Among these are:

(1) If the software is normally purchased, then unauthorized copies represent theft of the product, and therefore lost revenue to the publisher/copyright holder.

(2) The distributed copies of the product may need to be limited to a certain number for statistical purposes. Accordingly, unauthorized copies would contaminate usage statistics.

(3) Even if user-created copies are intended or allowed, the publisher may still want to track the number in use, or the number of copies made for statistical purposes.

(4) Each runnable copy of the software may represent a potential liability or obligation on the part of the publisher, such as the rights to software upgrades, technical support, and marketing/merchandising offers.

(5) The publisher may also wish to limit the number of times that its software is used, even by legitimate customers of the software. This would be licensing of software per use, or limitations on the number of times the software is used.

Various techniques are already used by publishers and distributors to control user-created copies. Each of these techniques has its strengths and its limitations.

For example, in the mid-1980's, various attempts were made to limit successful copying of disks (disk copy-protection). This usually involved the writing of secret ("uncopyable") information on the floppy disk or user's hard disk, preventing unauthorized copies from working because the secret information could not be copied by normal, simple copying techniques. These copy-protection strategies were eventually abandoned because the general public resisted purchasing such "copy-protected" products for many reasons. Specifically, they prevented legitimately backing up copies of purchased software. Also, there was a perception that some techniques could damage other legitimate information the user already had. Further, there was a feeling that the purchaser owned the software and therefore should be able to do with it as he pleased without undue restriction.

Usage-limiting techniques are currently being used to limit the number of simultaneous users of commercial software on local-area-networks (LANs). Typically, an organization will purchase the license to run a limited number of copies of a software product. The master copy of the software is placed on the LAN file server. Whenever a user on the LAN executes the software, another copy-restriction program is run which checks how many current users of that software there are, and either allows or rejects the particular user's request to run the software. This technique cannot limit the uses of the software by people not connected to the LAN, such as employees of the organization who wish to use the software at home.

Publishers can also place the software onto a medium that is difficult or expensive to copy, such as CDROM until writable CDROM drives become inexpensive. Or, they may make it difficult to copy the documentation/manual for the software, for instance, by choosing perfect-binding for their manuals. However, these methods primarily discourage, rather than prevent, copying.

SUMMARY OF THE INVENTION

In accordance with a broad aspect of the present invention, there is provided a method of copy-tracking software programs that are distributed over a computer network after the programs are distributed to users comprising the steps of encoding a plurality of a distributable computer-readable media with (i) a Software Payload to be tracked, (ii) a Tracker Client program and (iii) a Current Token readable by said Tracker Client program. A Tracker Server program is installed on a central computer on the network, and includes a database for storing Current Tokens received from the Tracker Client programs on the computer-readable media. The encoded computer-readable media are selectively installed on respective user computers that are connectable to the network. Each one of the user computers is operated to execute the Tracker Client program on the encoded medium installed thereon to access the Tracker Server program on the central computer via computer-to-computer communications over the network. Also, each one of the user computers executes the Tracker Client program to read the Current Token on the encoded medium installed thereon and to send the Current Token to the Tracker Server program; and the central computer executes the Tracker Server program to validate the Current Token to determine whether the Current Token has been previously received. If the Tracker Server program determines that the Current Token comes from a new user of the Tracker Client program, and the part of the Current Token called the Base Serial Number is not already in the Tracker Server database, then the Tracker Server program creates a new Current Token and stores the new Current Token in its database, and sends the new Current Token back to the Tracker Client program, and informs the Tracker Client program to allow access to the Software Payload. If the Tracker Server determines that the Current Token came from a new user, but the special part of the Current Token called the Base Serial Number is already in the Tracker Server database, then the Tracker Server program has determined that the Tracker Client program is a (unauthorized) copy and informs the Tracker Client program that access to the SoftwarePayload by the user should be rejected. If the Tracker Server program determines that the Current Token comes from a user who has already transacted with the Tracker Server, then the Tracker Server will lookup the received Current Token in its database. If the Current Token is in the Tracker Server database, then the Tracker Server program (1) returns a new Current Token with a unique component to the Tracker Client program for use when the Tracker Client program next accesses the Tracker Server program, (2) stores at least the unique component of the new Current Token in the Tracker Server database and (3) indicates to the Tracker Client program to permit execution of the Software Payload. Thereafter, the user computer executes the Software Payload whenever the Tracker Client program receives an indication from the Tracker Server program to permit execution of the Software Payload.

In accordance with another broad aspect of the present invention, there is provided a system for copy-tracking distributed software programs over a computer network after the programs are distributed to users comprising:

- a plurality of a distributable computer-readable media encoded with a Software Payload to be tracked, a Tracker Client program and a Current Token readable by the Tracker Client program;
- a central computer in the network, the central computer having installed thereon a Tracker Server program including a database for storing Current Tokens received from the Tracker Client programs;
- a plurality of user computers connectable to the network, each one of the user computers having operatively associated therewith one of the encoded computer-readable media;
- a plurality of means each including one of the user computers for executing the Tracker Client program on the encoded medium operatively associated therewith:
  - (a) to access the Tracker Server program on the central computer via computer-to-computer communications over the network;
  - (b) to read the Current Token on the encoded medium operatively associated therewith and to send the Current Token to the Tracker Server program; and
  - (c) to execute the Software Payload whenever the Tracker Client program receives an indication from the Tracker Server program to permit execution of the Software Payload; and means including the central computer for executing the Tracker Server program:
  - (d) to validate each Current Token sent thereto to determine whether the Current Tokens have been previously received;
  - (e) when the Tracker Server program determines that an incoming Current Token is from an old (previous transaction) user and that Current Token is not in its database, to optionally inform the Tracker Client program to prevent access to the Software Payload; and
  - (f) when the Tracker Server program determines that the incoming Current Token is from an old (previous transaction) user, and further determines that the Current Token is in its database, having stored it there during the previous transaction with the user.

any one of the Current Tokens have not been previously communicated to the Tracker Server program, (1) to return a new Current Token with a unique component to the respective Tracker Client program for use when the Tracker Client program next accesses the Tracker Server program, (2) to store at least the unique component of the new Current Token in the Tracker Server database and (3) to indicate to the Tracker Client program to permit execution of the Software Payload.

In accordance with yet another broad aspect of the present invention, there is provided a computer-readable medium for use in a system for copy-tracking distributed software programs over a computer network after the programs are distributed to users comprising:

the computer-readable medium having encoded thereon (i) a Software Payload to be tracked, (ii) a Tracker Client program and (iii) a Current Token readable by the Tracker Client program;

the Tracker Client program being computer executable to interact with a remote Tracker Server program executable by a central computer on the network for copy-tracking the distributed medium, the Tracker Server program maintaining a database of Current Tokens received from the Tracker Client (TC) program and other TC programs that are executable by computers on the network, the database being used for validating each Current Token received;

the computer-readable media being encoded with the following computer executable Tracker Client program instructions:
  - (a) to access the Tracker Server program on the central computer via computer-to-computer communications over the network;
  - (b) to read the Current Token on the computer-readable media and to send the Current Token to the Tracker Server program;
  - (c) when the Tracker Sever program validates the Current Token for execution of the Software Payload, to store a new Current Token with a unique component received from the Tracker Server program for use when the Tracker Client program next accesses the Tracker Server program; and
  - (d) to execute the Software Payload whenever the Tracker Client program receives an authorization from the Tracker Server program for execution of the Software Payload.

Thus, the invention tracks and controls access to distributed software by communicating with a central database which tracks the usage of the software and which can detect whether a user is attempting to execute an unauthorized copy of the software. In a specific aspect of the invention, each copy of the software, as originally distributed, contains a unique Serial Number, which is used to track usage of the software. The software can be distributed to known or unknown people, and as long as the recipients' computers can communicate with the central database (by, for instance, connecting to the Internet), the invention will work. This as necessary communication capability is a significant aspect of the invention, but there is no requirement for continuous connectedness (as on a LAN).

DEFINITION OF TERMS

As used herein, the following terms mean:

Software Payload (SP)

Software program(s) and/or data that the publisher wishes to track or control.

Base Serial Number (BSN)

This is a short piece of data: a unique number, or character sequence, distributed with each original copy of the Software Payload and Tracker Client (below). However, the present invention contemplates the use of distributable media, e.g. CDROMs, that are manufactured in batches with each batch having the unique number, or character sequence.

Current Token (CT)

This is a short piece of data: a combination or concatenation of the Base Serial Number (BSN) and other information such as a changing "key" value and "usage" count. However although less secure, it is within the scope of the present invention that the CT does not include a BSN, but includes the other information such as the changing "key" value and "usage" count.

Tracker Client (TC)

A program that is distributed with the Software Payload.

Tracker Server (TS)

A program that is located on a computer accessible by computer communications (central server) that communicated with the Tracker Client program.

DESCRIPTION OF SPECIFIC EMBODIMENTS

The method and system of the present invention tracks and controls usage of software packages after those packages have been distributed to known or unknown users. Aspects of the invention include software located in various places, and in addition, special data (unique Base Serial Number and/or a Key data field) distributed with the software to be tracked.

An example of a Software Payload (SP) is a stock analysis program wherein a publisher sells the analysis program that obtains stock information over the Internet from a particular Web site. The stock information also could be on a computer in a LAN. The publisher wants to make sure that this program is not copied and distributed by the user after the user received a copy of it on floppy disk. Using the terminology above, the stock analysis program is the Software Payload. The stock information may alternatively be on the distributable medium, such as a floppy disk or CDROM, with the Software Payload. In each case, the special data (unique Base Serial Number and/or a Key data field), along with the method implemented by the Tracker Client and Tracker Server programs, selectively provide the "key" to open the "lock" provided by the present invention for controlling access to the Software Payload.

The publisher places on each distribution disk a copy of the Tracker Client program, and also a Current Token including a unique Base Serial Number in a file (or other form) that can be read by the Tracker Client program. When the user installs the stock analysis program on a hard disk, the Tracker Client program and the Serial Number are also installed.

Each time the user runs the stock analysis program, the Tracker Client program is started first. The Tracker Client program communicates over the Internet with the Tracker Server program. The Tracker Client program sends the Current Token to the Tracker Server program. The Current Token includes the Base Serial Number and other information. The Tracker Server program validates the Current Token, and ascertains whether that Base Serial Number has previously been sent to it.

If this is the first time the Tracker Client communicates the Current Token to the Tracker Server, then the Tracker Server will not yet have received the Base Serial Number. The Tracker Server will ascertain that it has not yet received the Base Serial Number by looking for it in its database. Presuming that it doesn't find it, the Tracker Server will create a special "key" and return it to the Tracker Client along with permission to execute the Software Payload (in this case, the stock analysis program). The Tracker Server will also store the Current Token which includes the Base Serial Number and the "key" it has created (along with other information comprising the Current Token).

If this is not the first time the Tracker Client is communicating with the Tracker Server, then the Tracker Client must send not only the Base Serial Number, but also the "key" that the Tracker Server had sent it during the most previous communication/transaction (and other information comprising the Current Token). The Tracker Server has stored both Base Serial Number and "key" and so it can detect a match the next time the Tracker Client sends them to the Tracker Server.

If the Tracker Server receives a Base Serial Number and Key that are already in its database, then the Tracker Server creates a new "key" and stores it in its database and at the same time sends the "key" back to the Tracker Client along with permission to execute the Software Payload. If the Tracker Server receives a Base Serial Number and a "key" from the Tracker Client such that the "key" does not match the Base Serial Number stored in the Tracker Server's database, then an unauthorized copy has been detected and the Tracker Server will send the Tracker Client a message to that effect, telling the Client to refuse permission to execute the Software Payload.

The user need not be aware of the existence or the operations of the Tracker Client program. Since the user expects to be communicating over the Internet anyway to obtain stock data for the stock analysis program, a small delay while the Tracker Client program is checking with the Tracker Server program may not be noticed.

The user may even copy all of the stock analysis package to another computer, as long as the Tracker Client program and current Serial Number are also copied. In this case, of the two copies of the entire package, whichever is used the first time after the copy was made, will be considered the legitimate copy, and the other, now "illegitimate" copy will be rejected when used.

Base Serial Number (BSN)

In one aspect of the invention, the Base Serial Number is intended to be unique by a different Base Serial Number being created with each copy of the Tracker Client distribution package. Thus, each copy of the distribution medium made by the publisher will have a unique BSN on it.

This serial number can be generated in a variety of ways, and preferably includes a method of checking its validity, such as a checksum.

When a group of disks is manufactured for software distribution, part of the Serial Number can be used to identify the batch of disks that were manufactured as a group.

For instance, a typical Base Serial Number can be:

customer:04-batch:159-sequence:112369-check:9102

The above Base Serial Number is composed of four different fields, each separated by a hyphen, i.e., Customer number, Batch number, Sequence number and Check digits. The encoding of the information above is very verbose, e.g., "customer" is spelled out. However, abbreviations and compression can be used without changing the underlying operations theory.

The above BSN identifies the disk as belonging to Customer number "04"; of the 159th Batch of manufactured disks; disk Sequence number: 112369 (disk numbers do not have to be sequential) in that batch.

The Check digits are calculated as a secret function of the rest of the fields, to ensure that the user cannot simply create an arbitrary Base Serial Number by tampering with the file containing the Base Serial Number and its check digits. Standard software techniques, such as CRC-32 or even a simple checksum might suffice to produce the Check digits, although many variations exist to choose from. Since the Base Serial Number is stored on the distribution medium, and may be placed onto the user's hard disk (where the Serial Number can be changed by a user), the secret nature of the Check digit calculation prevents tampering. The Tracker Client program always validates the Serial Number whenever it reads it, and will take appropriate action if the Base Serial Number is invalid (disk error or detected tampering seen in invalid Check digits). The Check digits can also be used to validate a Base Serial Number by the Tracker Server program, the first time the Tracker Client program communicates with it. Encrypting the Serial Number on the distribution medium would create a further safeguard against tampering because the resultant data would be unintelligible by the user and therefore harder to change successfully.

Current Token (CT)

The Current Token is a piece of data composed of the Base Serial Number, and other fields:

BSN-Key:00-Copy:0-Usage:0

The Current Token is sent from the Tracker Client program to the Tracker Server program. If the transaction is successful, the Tracker Server program makes some modifications to the Current Token, stores it in a database and then sends it back to is the Tracker Client program. The new Current Token is stored by the Tracker Client program on the user's machine, and when the Tracker Client program is activated again, this new Current Token is the one that is sent to the Tracker Server program.

The Usage count is used to track the number of times the Tracker Client program is used, and will be incremented by the Tracker Server program each time the user executes the Tracker Client program and the Tracker Server program successfully runs.

The Key is a special number created by the Tracker Server program, and stored in its database (after the first time the Tracker Client program checks in). This Key validates uses of the software subsequent to the first time the Tracker Client program and the Tracker Server program communicate. If the Tracker Client program presents an invalid Key to the Tracker Server program and if the Tracker Server program is programmed for unauthorized copy-rejection, the Tracker Server program will reject that number and inform the Tracker Client program to disallow usage of the software. However, the Copy field can be used to count the number of unauthorized copies, rather than rejecting them. Variations or alternatives will be described hereinafter.

The "Copy" field may be set by the Tracker Server program (initialized to 0 or 1), and contains the number of "unauthorized" copies known by the Tracker Server program. This is only important if the Tracker Server program wishes to allow "unauthorized" copies to be used. Otherwise the Tracker Server program will simply disallow the Tracker Client program to run, and this "copy" field would be irrelevant.

In case the Tracker Server program allows copies to run, this "copy" field will uniquely identify each copy (each allowed/detected copy will have a different number in this field).

The "usage" field is incremented each time the Tracker Client program sends the Current Token to the Tracker Server program. When this field is "0", the Tracker Server program knows that the Tracker Client program is communicating with it for the first time.

Figure 1:
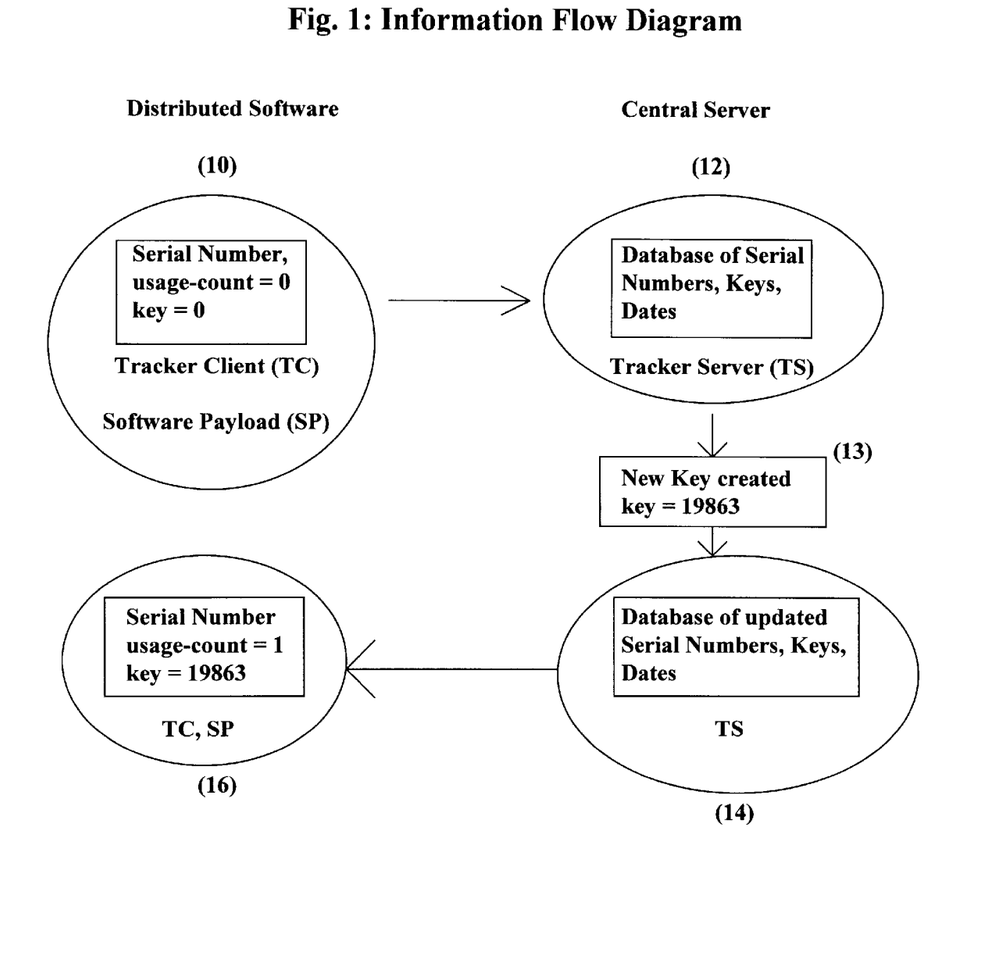
FIG. 1 diagrammatically shows information flow between a Tracker Client program (TC) and a Tracker Server program (TS) in accordance with an embodiment of the present invention.

With reference to FIG. 1, information flow between the two parties to the transactions, the Tracker Client program (TC) and the Tracker Server program (TS) is diagrammatically shown.

The top-left circle 10 shows the "occupants" (data and programs) on the user's computer after the installation of the Tracker Client software, namely the Tracker Client program, the data corresponding to Current Token (CT-Base Serial Number, etc.), and the Software Payload consisting of those programs whose copying needs detection/prevention, such as the stock analysis program. In FIG. 1, the Usage-count=0 and the Key is initially set to 0.

The top-right circle 12 shows the Tracker Server program and its information (the database of Serial Numbers that have been used and their current keys). In this circle 12, the Tracker Server program has just received a request from the Tracker Client program, the request containing the Current Token.

As the flow is followed downwards to circle 14 in FIG. 1, the Tracker Server program checks the existence of the Current Token (CT) in its database, generates a new Key 13 and stores it inside the new Current Token, stores the new Current Token in its database, and returns the new Current Token back to the Tracker Client program in circle 16.

Appendix I and Appendix II of the instant specification provide specific program listings for embodiments of a Tracker Client program and a Tracker Server program, respectively. These code listings configure a general purpose computer to create specific logic circuits that are claimed hereinafter.

Tracker Client Program—See Code Listings in Appendix I

Figure 2:
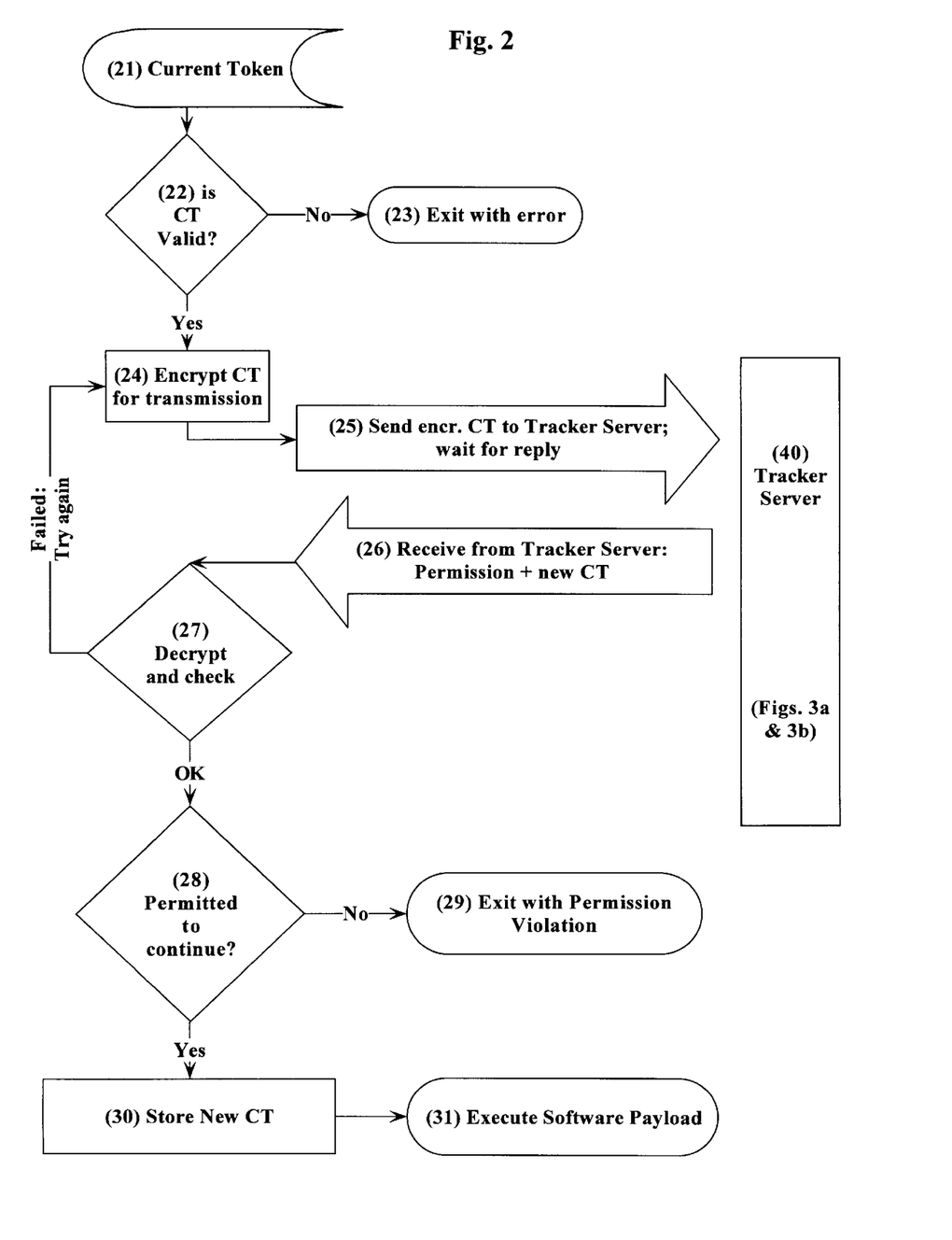
FIG. 2 is a flow diagram of an embodiment of the Tracker Client program.

With reference to FIG. 2, the Tracker Client program is distributed with the software to be tracked (Software Payload), and controls access to that software. Prior to any execution of the Base Software Payload, the Tracker Client program reads the Current Token from disk 21 and checks the validity 22 of the Current Token. If Valid, the Current Token is encrypted and check digits are added for transmission 24. The encrypted Current Token is transmitted 25 to the Tracker Server program FIGS. 3a & 3b, and a response is received from the Tracker Server program 26 consisting of at least:(a) whether to allow the execution of the Software Payload; and if so, (b) the new Current Token with its unique Key. The new Current Token is decrypted 27, and, if permitted to continue 28, the new Current Token is stored 30 and the Software Payload 31 is executed. This program is exited at 23 and 29 when the Current Token is not valid and when there is a permission violation, respectively. The program also provides for a try again if the permission and new Current Token fail a check 27.

Tracker Server Program—See Code Listings in Appendix II

Figure 3A:
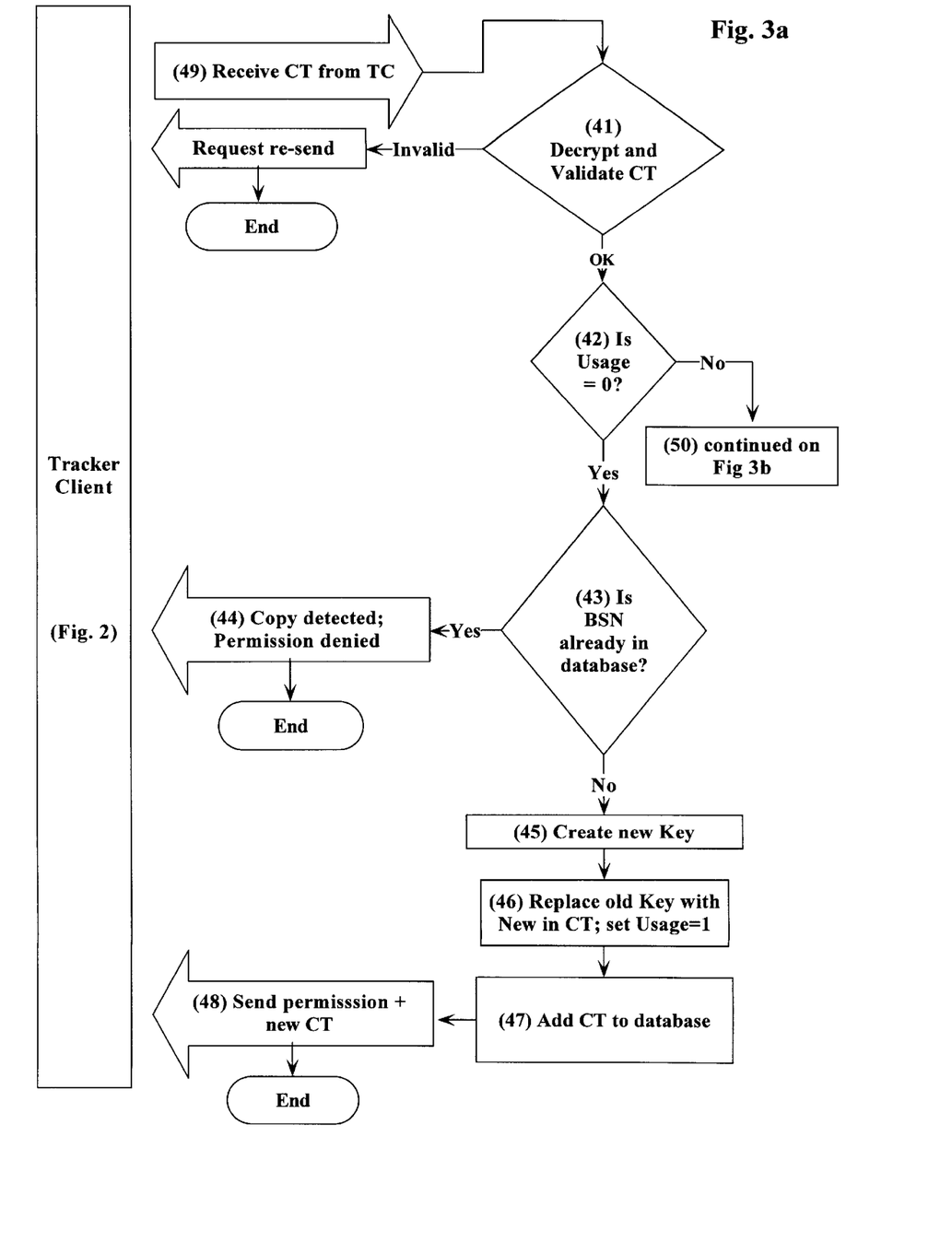
FIGS. 3a and 3b are flow diagrams of an embodiment of the Tracker Server program on a Central Server.
Figure 3B:
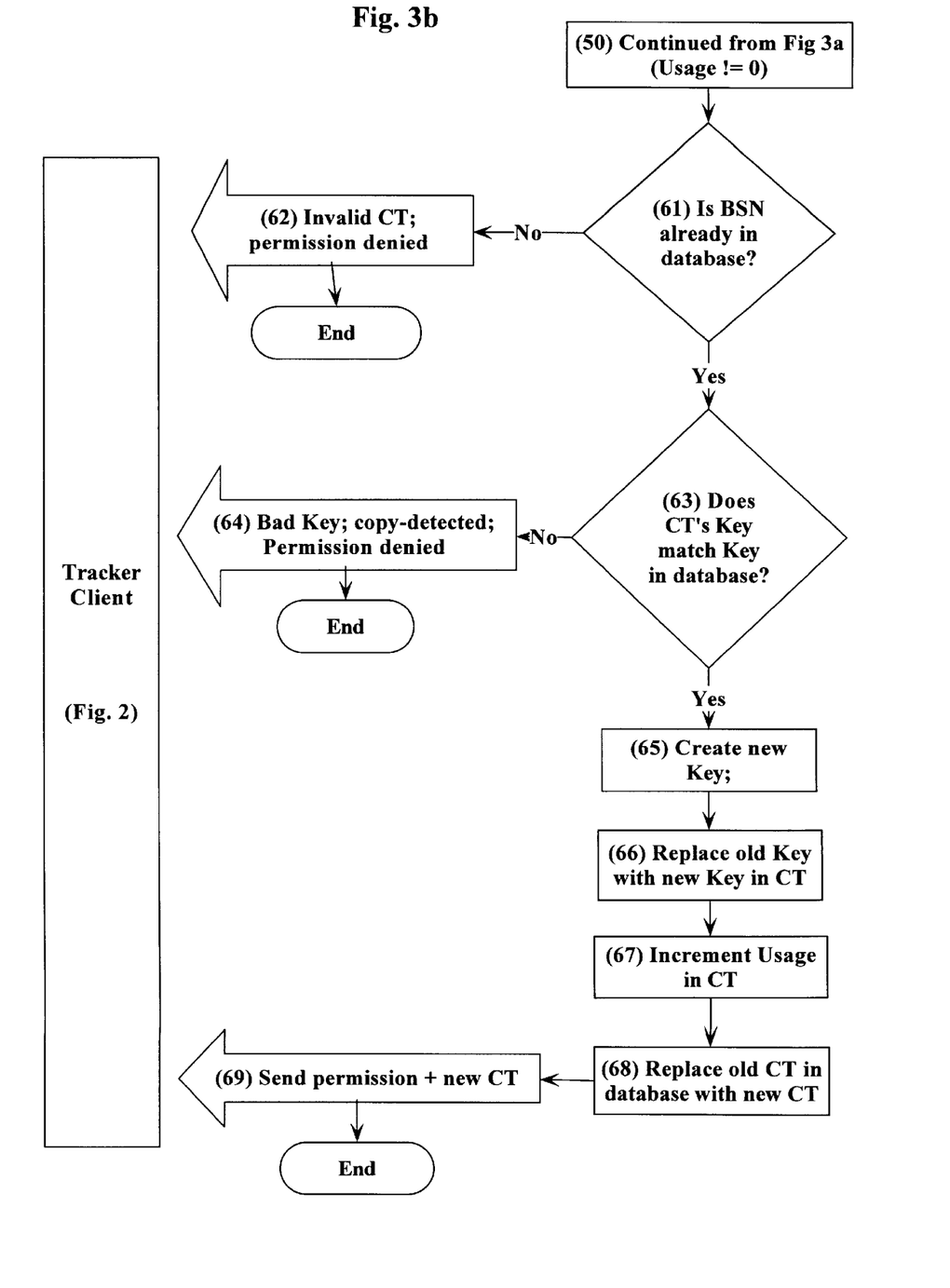

The Tracker Server program of FIGS. 3a & 3b runs on a computer that is accessible by electronic communication with the Tracker Client program, and is not under the control of the user, but rather under the direct or indirect control of the software publisher or a central service bureau. The Tracker Server program receives messages 49 from and sends messages to Tracker Client programs, as described above, and handles the database of Current Tokens, and any other statistical information. The Tracker Server program also generates new Keys to be placed into Current Tokens that are stored and sent.

Current Tokens received from the Tracker Client program 49 are decrypted and validated 41. Validation may be by decryption and/or check digits techniques. If the Current Token is invalid, a request to re-send is made in the event the transmission from the Tracker Client program was garbled.

If the retransmitted Current Token remains invalid after a predetermined number of trys, an invalid instruction is returned to the Tracker Client program and the Tracker Server program ends.

The first time the Tracker Client program checks in, the Current Token (CT) will have a Usage count 42 of zero. If the Base Serial Number is already in the database of the Tracker Server program 43, a copy of the disk is detected, and permission to enter the Tracker Server program is denied 44. On the other hand, if the Current Token has such a Usage count of zero, and the Base Serial Number is not already in the database, the Tracker Server program creates a new Key 45, sets the Usage Count to one, and places them in the new Current Token Key and Usage fields 46. Then this new Current Token is both stored in the database 47 of the Tracker Server program, and sent back to the Tracker Client program 48.

If the Tracker Server program receives a Current Token with a non-zero Usage count 50 (FIG. 3b), then that Current Token should already be in the database because it was previously generated by the Tracker Server program, and sent to the Tracker Client program. First, the Base Serial Number is compared to those in the TS database 61. If the Base Serial Number is already in the TS database, the Key of the Current Token sent by the Tracker Client program is compared to Keys in the database 63. If the CT Key finds a match Key, then a new Key is created 65, the old Key is replaced by the new Key in the CT 66, and the Usage count in the CT is incremented 67. Then the new Current Token replaces the older one in the TS database 68, and sent back to the Tracker Client program with permission to access/execute the Software Payload 69. The Tracker Client program stores the new Current Token for the next use 30 (FIG. 2).

However, if the Tracker Server program receives a Current Token with a non-zero Usage count, and with a Base Serial Number that is not in the TS database, then the Tracker Server program will conclude that the Current Token has been tampered with (although the check digits should have guarded against this). The TS program will then declare the Current Token invalid and deny permission to execute the Software Payload 62. Similarly, if the Key of the incoming Current Token does not find a match in the TS database, the Key is bogus and permission to execute the Software Payload is denied 64. [, or, more likely, that it is an old Serial Number being sent by a copy of the disk used by another person, and therefore deny permission 61,62.

For instance, suppose person A's software has a current Usage count of 4, and he makes a copy of the software and gives it to person B on Tuesday. On Wednesday, person A executes the software, and the Tracker Server program sends back a Current Token with a Usage count of 5, and the Tracker Server program also stores that Current Token, replacing the previous Current Token which had a Usage count of 4. On Thursday, person B attempts to use B's copy of the software, and sends the Tracker Server program B's Current Token, which still has a Usage count of 4. The Tracker Server program will immediately notice that Current Token has already been incremented to a Usage of 5, and that its Key is different from the one currently in the Tracker Server database, and therefore will detect that copying has taken place.]

As an important aspect of the invention to further prevent tampering, the Tracker Server program creates and checks the Key field. This Key field will be created by the Tracker Server program (for instance, by a random number generator on the Tracker Server program). Since this Key is also stored in the TS database, a user cannot simply increment user's own Usage count and send it to the Tracker Server program. Every time the Usage count is incremented by the Tracker Server program, a new Key field is also generated and is stored in the database along with the rest of the Serial Number. The tampering user would have to create this new Key field exactly to match the one already stored in the Tracker Server's database, as well as incrementing the Usage count, and the tampering user would not know the algorithm for the creation of the Key field.

Therefore, an important aspect of the present invention that is used to prevent unauthorized copying is the fact that each user's most previous transaction with the Tracker Server program is recorded (the new generated Key is remembered) and the user must present this new key for the next transaction. This aspect is (1) creating a new Key on each transaction between the Tracker Client program and the Tracker Server program. This Key can be generated using, e.g., a random-number generator seeded by the time of day, so that there is no client-perceived pattern to the keys. (2) The new Key is saved in the database of the Tracker Server program and sent back to the Tracker Client program. (3) The next time the Tracker Client program makes an access request, the Tracker Client program needs to submit the same Key that was previously saved in the database of the Tracker Server program.

Thus, the system can be used to prevent unauthorized copying by rejecting (via the Tracker Server program) any Current Token with a non-zero Usage count which is not already in the database.

To attack this copy-protection mechanism successfully, the attacker would have to create a Current Token that matches the one already stored from a previous transaction in the Tracker Server's database. Assuming that the attacker cannot breach the security of the Tracker Server computer and simply look at and copy the appropriate record in the Tracker Server's database, the attacker would have to tamper with the Current Token on the user's (attacker's own) machine and create the correct Current Token there. To do this, the attacker would have to be able to decrypt the Current Token to understand which part of it to change. The attacker would have to understand how the check digits were generated because this is an immediate integrity check to prevent random changes to the Current Token. Then the attacker would have to understand how the previous key was generated by the Tracker Server (and perhaps at exactly what time the Tracker Server created the most previous key since that key might have been generated as a random function of the transaction time). After all of this was done successfully, the attacker would need to append the check digits correctly, and encrypt the Current Token correctly to pass the integrity checks used by both the Tracker Client and Tracker Server.

As a variant to rejecting copies, the system can be used to count and track the copies. When a copy is detected, the Tracker Server program simply increments the Copy field to the current number of copies detected for that base Serial Number, and sends the new Serial Number back to the Tracker Client program. Henceforth, that Serial Number, with its unique Copy Field, is treated as perfectly legitimate, and warrants its own database record.

The system also can be used to count and limit the number of times the software is used, by limiting the Usage count. If an incoming Serial Number has a usage count larger than the limit, the Tracker Server program will tell the Tracker Client program to reject execution of the software.

Further, the system can be used to limit the period of time the software is executable. Since the system knows when a particular software copy was first executed and can store that date, it can limit usage of that copy to any period of time (for instance, an evaluation period of 30 days from first use can be enforced).

The Tracker Server can check the validity of each new Base Serial Number (from each new user transacting for the first time, i.e., when Usage count=0) as disclosed hereinabove. One embodiment consists of checking the encryption and check digits of the Base Serial Number (and Current Token), and making sure that the Base Serial Number has not already been transmitted previously to the Tracker Server (which records each new Base Serial Number into its database). One alternative embodiment is safer, and it includes the disk manufacturer formulating a table of all new Base Serial Numbers that the manufacturer assigned to the new disks, and providing the table to the Tracker Server database. In this alternative embodiment, it would be impossible for an attacker to create a wholly new Base Serial Number and transmit it to the Tracker Server program without being rejected because the Tracker Server program would already have received the complete table of all of the manufactured Base Serial Numbers. The only way that this attack might work would be if the attacker, by chance, created a new Base Serial Number that happened to be in the manufacturer's table, and that Base Serial Number had not yet been used. In any case, this alternative embodiment is only vulnerable to the limited number of Base Serial Numbers that were created. In other words, if the manufacturer creates only 1,000 Base Serial Numbers, then the Tracker Server program will only consider those 1,000 Base Serial Numbers to be legitimate. Therefore, even if an attacker knew the manufacturer's private table, the attacker can make no more than 1,000 copies.

There are forms of distributable media that are manufactured by a strict duplication method which makes only identical copies in batches with all copies in each batch having a common batch Base Serial Number. CDROMs are typically made by this method. When such distributable media are used in the present invention, the Current Token of each distributable medium in the batch includes a Base Serial Number field with the common Base Serial Number therein and initially an empty Key field. When the Tracker Client program first communicates the Current Token of each one of the distributable medium to the Tracker Server program, the Tracker Server program searches the Tracker Server database to confirm that the common Base Serial Number is authorized, and when authorized the Tracker Server program creates a unique Key and placing the Key in the Key field of the Current Token to form the new Current Token. The Tracker Server program also stores the new Current Token including the common Base Serial Number and the created Key. Thereafter, when the Tracker Server program receives a Current Token with a Base Serial Number and Key that match the stored common Base Serial Number and the created Key, the Tracker Server program creates a new Key and stores the new key in the Tracker Server database, and returns a new Current Token with the new Key to the Tracker Client along with permission to execute the Software Payload.

Rather than having a unique Base Serial Number embedded onto the distribution medium (e.g., floppy disk), another embodiment provides for generation of the Base Serial Number by the user's program the first time the Tracker Client program is run. While less secure, this could still allow the detection of duplication of the program after it had been executed once (when the Base Serial Number was generated). This technique is useful under those circumstances when a unique Base Serial Number cannot be embedded on each copy of the distribution medium, because of manufacturing constraints, for example with typical CDROMs.

As noted above, all CDROMs in a batch of CDROMS typically have the same Serial Number. In another embodiment of the present invention, a unique group of mutually distinctive Base Serial Numbers are reserved for CDROMS, and one of these reserved numbers is installed on each distinct batch of CDROMs as a Base Serial Number in an unchangeable Serial Number field of the Current Token. This installation can suitably be performed when the (i) Software Payload to be tracked, (ii) the Tracker Client program and (iii) the Current Token are installed on the CDROM. This embodiment can be used for any distributable software medium that cannot have a unique serial number for each copy at the time of manufacture. Also, it is apparent that this embodiment can be used on distributable software media in combination with or in lieu of existing unique Base Serial Numbers.

Thus, the present invention provides a central computer site on a computer network for detecting authorized or unauthorized duplication of distributed software on computers connected to such a network. The computers on the network may be continually connectable by simply turning them on, like computers on a Local Area Network (LAN), or intermittently connectable, like computers on the Internet. Every time a user of the distributed software attempts to execute that software, a connection to the central computer site on the network is made, and a previously-created information token is presented by the user's software to the central site. The central site evaluates that token, and possibly issues a new token to be kept by the user for the next transaction. These transactions need no human intervention, and may take place without the software user's knowledge. At the same time, the central site may provide or withhold permission for the user to execute the distributed software. Using this information token, the central site can detect when a user uses a copy not made at the factory and track the execution of any such software copies. The central site need not know the identity of those using the software, nor the identities of the computers on which the software is executed.

Other examples of Software Payloads (SP) for use with the present invention are on game disks and film on CDROMs whereby copying is prevented and/or time of use is constrained. Also, rental software can use the invention to limit the duration of use and/or the number of uses.

Another example is the use of a distributable medium used for a contest wherein the contest is run from a program on the medium with one entry per copy of the medium.

The invention can be practiced on any system using electronic communication via a computer network. For example, distributable medias suitable for use in the present invention are any means for distributing data or software such as Smart Cards (data), or electronic distribution of software such as by E-mail. An additional example of the type of data that the "Key" and "Lock" aspects of the present invention can guard are electronic forms of money or credit.

While the invention has been described in conjunction with specific embodiments thereof, it is evident that many alternatives, modifications, and variations will be apparent to those skilled in the art in light of the foregoing description. Accordingly, it is intended to embrace all such alternatives, modification, and variations as fall within the spirit and broad scope of the appended claims.

APPENDIX I

FIG. 2: Tracker Client C Code listings
```
/* *************************************************************
            Tracker Client Processing (FIG. 2)
   ************************************************************* */
/* ********** Tracker Client Data Structures ******************** */
struct CURRENT_TOKEN {
    char BaseSerialNumber[15];
    long Key;
    long Check;
    short int UsageCount;
    short int CopyCount;
} CT;
struct SERVER_REPLY {
    struct CURRENT_TOKEN newCT;
    short int Permission;
} SR;
char EncryptedCT[30];
char EncryptedReply[50];
/* ********************* Tracker Client Constants ************ */
#define MAX_WAIT_TIME    30
#define MAX_RETRIES      3
/* **************** Tracker Client main processing ************ */
short int TrackerClient(void)
{short int retries;
        /* FIG. 2 (21)–(23): */
        /* read the Current Token from disk, */
        /* and check validity */
    if (GetCurrentToken(&CT)) == ERROR)
    {   PrintMessage("ERROR: Cannot read essential information from disk.");
        return (ERROR);
    }
        /* FIG. 2 (24): */
        /* encrypt and add check digits */
    EncryptForTransmission(EncryptedCT, &CT);
        /* FIG. 2 (25)–(27) */
        /* try to send to Tracker Server up to */
        /* MAX_RETRIES times, waiting up to MAX_WAIT_TIME
        */
        /* each time for a valid reply */
    for (retries = 0; retries < MAX_RETRIES; ++retries)
    {   long time_start = time();
            /* FIG. 2 (25) Send CT to Tracker Server */
        SendToTrackerServer(EncryptedCT);
        while (time() < time_start + MAX_WAIT_TIME)
        {       /* FIG. 2 (26): try to get reply from Server */
            if (GetServerReply(EncryptedReply) == TRUE)
                    /* FIG. 2 (7) decrypt; check validity */
                if (CheckDecryptReply(&SR, EncryptedReply) ==
TRUE)
                    goto CheckPermission;
        }
        ++retries;
    }
        /* ran out of time and retries, */
        /* cannot successfully communicate with server */
    PrintMessage("Unable to validate disk with Server.");
    return (ERROR);
CheckPermission:
        /* FIG. 2: (28) Check returned Permission */
    if (SR.Permission == PERM_DENIED)
    {   PrintMessage("Unauthorized disk usage!");
        return (ERROR);
    }
        /* FIG. 2 (30) store the new CT for next time */
    StoreCurrentToken(&SR.newCT);
    return (TRUE);
}
```

APPENDIX II

FIGS. 3a and 3b: Tracker Server C Code Listings
```
/* *************************************************************
            Tracker Server Processing (FIG. 3a & 3b)
   ************************************************************* */
```

APPENDIX II-continued

```
/* *********** Tracker Server Data Structures ***************** */
struct CURRENT_TOKEN {
    char BaseSerialNumber[15];
    long Key;
    long Check;
    short int UsageCount;
    short int CopyCount;
} CT2;
struct SERVER_REPLY {
    struct CURRENT_TOKEN newCT;
    short int Permission;
} SR2;
struct DATABASE_ENTRY {
    char BaseSerialNumber[15];
    long Key;
    short int UsageCount;
    short int CopyCount;
    time_t LastUsed;
} Entry;
/* ********************* Tracker Server Processing *********** */
short int TrackerServer(char *ReceivedTransmission)
{char SQL_Statement[200];
REC_ID rec;
        /* FIG. 3a (49 & 41) */
        /* Decrypt incoming message from Client */
        /* and check validity */
    if (DecryptIncomingTransmission(&CT2, ReceivedTransmission) !=
TRUE)
    {   SR2.Permission = ERROR_REQUEST_RETRY;
        SendToClient(&SR2);
        return(ERROR);
    }
        /* Try looking up the BSN in the */
        /*Database, called ôCT-BASEô */
    sprintf(SQL_Statement, "select BSN, KEY, USAGE, COPY from \
        CT-BASE where BSN = \"%s\" ", CT2.BaseSerialNumber);
    rec = RunSQL(SQL_Statement);
        /* FIG. 3a (42) */
        /* Is UsageCount = 0?, then first time usage */
    if (CT2.UsageCount == 0)
    {
            /* FIG. 3a (43) */
            /* Is BSN already in Database? */
        if (rec > 0)
        {
                /* FIG. 3a (44) */
                /* Copy detected; deny permission */
            SR2.Permission = ERROR_ISCOPY;
            SendToClient(&SR2);
            return(ERROR);
        }
            /* FIG. 3a (45–48) */
            /* BSN is not in database, so create a new Key,
            and put new entry in database */
            /* FIG. 3a (47) */
            /* put new Entry into database */
        Copy(CT2.BaseSerialNumber, Entry.BaseSerialNumber, 15);
        Entry.Key = CreateNewKey();
        Entry.UsageCount = 1;
        Entry.CopyCount = 1;
        Entry.LastUsage = time();
        AppendToDatabase(&Entry);
        CT2.Key = Entry.Key;
        CT2.UsageCount = 1;
            /* FIG. 3a (48) */
            /* Send Acceptance + new CT to Client */
        SR2.Permission = PERM_ACCEPT;
        SR2.newCT = CT;
        SendToClient(&SR2);
        return(TRUE);
    }
    else
    {   /* UsageCount not 0 */
            /* FIG. 3b (61–62) */
            /* BSN should already be in the database, */
            /* if not, then something is wrong, tell Client */
        if (rec == 0)
        {   SR2.Permission = ERROR_BAD_BSN;
            SendToClient(&SR2);
```

APPENDIX II-continued

```
            return(ERROR);
    }
        /* FIG. 3b (63–64) */
        /* MAIN CHECK: does Key in database match incoming */
        /* Key from Client? */
    GetDatabaseRecordFields(rec, &Entry);
    if (Entry.Key != CT2.Key)
    {   SR2.Permission = ERROR_DUPLICATE;
        SendToClient(&SR2);
        return(ERROR);
    }
            /* FIG. 3b (65–68) */
            /* Everything is fine. Create new key; */
            /* replace old Key with new; */
            /* Increment UsageCount */
            /* replace old Database record */
    Entry.Key = CreateNewKey();
    ++Entry.UsageCount;
    ReplaceDatabaseRecord(rec, &Entry);
        /* FIG. 3b (69) */
        /* Send new CT back to Client with Permission */
        /* to continue */
    CT2.Key = Entry.Key;
    CT2.UsageCount = Entry.UsageCount;
    SR2.newCT = CT;
    SR2.Permission = PERM_ACCEPT;
    SendToClient(&SR2);
    return(TRUE);
    }
}
/* ******************* CreateNewKey ******************* */
long CreateNewKey()
{long result;
        /* typical pseudo-random number based on the */
        /* time-of-day. */
    randseed(time());
    result = rand() | (rand() << 16);
    return(result);
}
→
```

What is claimed is:

1. A method of copy-tracking distributed software programs over a computer network after the programs are distributed to users comprising the steps of:

(a) encoding a plurality of a distributable computer-readable media with (1) a Software Payload to be tracked, (2) a Tracker Client program and (3) a Current Token readable by the Tracker Client program and including a Key field and a Usage field;

(b) installing a Tracker Server program on a central computer in the network, the Tracker Server program including a database for storing Current Tokens received from the Tracker Client programs;

(c) selectively installing the encoded media on respective user computers that are connectable to the network;

(d) operating each one of the user computers to execute the Tracker Client program on the encoded medium installed thereon to access the Tracker Server program on the central computer via computer-to-computer communications over the network;

(e) the user computer of step (d) executing the Tracker Client program to read the Current Token on the encoded medium installed thereon and to send the Current Token to the Tracker Server program;

(f) the central computer executing the Tracker Server program to validate the Current Token of step (e); if the Current Token is invalid the Tracker Server program is executed to request a re-send or to inform the Tracker Client program to prevent access to the Software Payload;

(g) if the Tracker Server program validates the Current Token in step (f) and the Usage field is set to zero to indicate that the Tracker Client program is initially communicating with the Tracker Server program, the Tracker Server program is executed by the central computer (1) to return a new Current Token with a new Key in the Key field to the Tracker Client program for use when the Tracker Client program next accesses the Tracker Server program, (2) to store at least the Key of the new Current Token in the Tracker Server database, (3) to set the Usage field to one, and (4) to indicate to the Tracker Client program to permit execution of the Software Payload; or (h) if the Tracker Server program validates the Current Token in step (f) and the Usage field is set to greater than zero to indicate that the Tracker Client program has previously communicated with the Tracker Server program, the Tracker Server program is executed by the central computer (1) to determine whether the Key in the Key field matches a Key in the Tracker Server database, and if there is a match, (2) to return a new Current Token with a new Key in the Key field to the Tracker Client program for use when the Tracker Client program next accesses the Tracker Server program, (3) to store at least the Key of the new Current Token in the Tracker Server database, (4) to increment the Usage field by one, and (5) to indicate to the Tracker Client program to permit execution of the Software Payload; and if in (1) above the Key in the Key field does not match a Key in the Tracker Server database, optionally informing the Tracker Client program to prevent access to the Software Payload; and (i) repeating steps (d) to (h) for the other user computers.

2. The method of claim 1 wherein in step (h) the Tracker Server program instructs the Tracker Client program to prevent access to the Software Payload whenever the Key in the Current Token does not match a Key in the Tracker Server database, and the Tracker Client program is executed by the user computer to prevent such access.

3. The method of claim 1 further comprising the user computer executing the Software Payload whenever the Tracker Client program receives an indication from the Tracker Server program to permit execution of the Software Payload.

4. The method of claim 1 wherein in step (h) a copy the Tracker Client program is detected when a Key in the Key field does not match a Key in the Tracker Server database, and wherein the Tracker Server program increments a database for recording a current number of copies detected for the respective Current Token.

5. The method of claim 1, wherein the Keys are each unique characters formed of randomly generated numbers and/or letters.

6. The method of claim 1 wherein initially the Current Token of each distributable medium includes a Base Serial Number field with a Base Serial Number therein and an empty Key field;

when the Tracker Client program first communicates the Current Token to the Tracker Server program, the Tracker Server program searches the Tracker Server database to confirm that the Base Serial Number has not been previously received, and the Tracker Server program creates a unique Key and places the Key in the Key field of the Current Token to form the new Current Token;

the Tracker Server program also stores the new Current Token including the Base Serial Number and the created Key; and thereafter when the Tracker Server program receives a Current Token with a Base Serial Number and Key that match the stored Base Serial Number and the created Key, the Tracker Server program creates a new Key and stores the new key in the Tracker Server database, and returns a new Current Token with the new Key to the Tracker Client along with permission to execute the Software Payload.

7. The method of claim 1 wherein the Current Token of each distributable medium includes a Base Serial Number and a Key, and wherein if the Tracker Server program receives a Current Token having a Base Serial Number and a Key from a Tracker Client, and the Key does not match the Key associated with the Base Serial Number stored in the Tracker Server database, then an unauthorized copy has been detected, and optionally the Tracker Server program sends the Tracker Client program an instruction refusing permission to execute the Software Payload.

8. The method of claim 7 wherein the Tracker Server program sends the Tracker Client program an instruction refusing permission to execute the Software Payload.

9. The method of claim 1 wherein initially the Current Token of each distributable computer-readable medium includes as the unique component an empty Base Serial Number field and an empty Key field;

when the Tracker Client program first communicates the Current Token to the Tracker Server program, the Tracker Server program recognizes the empty Base Serial Number field and the empty Key field and advances to step (g) wherein the Tracker Server program places a distinctive Base Serial Number in the Base Serial Number field and creates a unique Key and placing the unique Key in the Key field of the Current Token to form the new Current Token, and the new Current Token is returned to the Tracker Client program with permission to execute the Software Payload;

the Tracker Server program also stores the new Current Token including the distinctive Base Serial Number and the created Key in the Tracker Server database; and thereafter whenever the Tracker Server program receives a Current Token with a Serial Number and a Key that match the stored distinctive Base Serial Number and the created Key, the Tracker Server program creates a new Key and stores the new key in the Tracker Server database, and returns a new Current Token with the new Key to the Tracker Client program along with permission to execute the Software Payload.

10. The method of claim 1 wherein in step (a) the Current Token further includes a Base Serial Number in an unchangeable Base Serial Number field.

11. The method of claim 1 wherein the distributable computer-readable media are manufactured by a strict duplication method which makes only identical copies in batches with all copies in each batch having a common batch Base Serial Number, and wherein initially the Current Token of each distributable medium in the batch includes a Base Serial Number field with the common Base Serial Number therein and an empty Key field;

when the Tracker Client program first communicates the Current Token of each one of the distributable computer-readable media to the Tracker Server program, the Tracker Server program searches the Tracker Server database to confirm that the common Base Serial Number is authorized, and the Tracker Server program changes the component of the Current Token by creating a unique Key and placing the Key in the Key field of the Current Token to form the new Current Token;

the Tracker Server program also stores the new Current Token including the common Base Serial Number and the created Key; and thereafter when the Tracker Server program receives a Current Token with a Base Serial Number and Key that match the stored common Base Serial Number and the created Key, the Tracker Server program creates a new Key and stores the new key in the Tracker Server database, and returns a new Current Token with the new Key to the Tracker Client along with permission to execute the Software Payload.

12. The method of claim 1 wherein the Current Token comprises a plurality of fields including Key, Copy and Usage represented by:

$$Key{:}00{-}Copy{:}0{-}Usage{:}0$$

in which:

the Usage field tracks the number of times the Tracker Client program is used, the Key is formed of unique characters created by the Tracker Server program for the Current Token and is also stored in the Tracker Server database, and functions to validate uses of the Current Token subsequent to the first time the Tracker Client program and Tracker Server program communicate, wherein if the Tracker Client program presents an invalid Key to the Tracker Server program (i) the Tracker Server program will reject the invalid Key and inform the Tracker Client program to disallow usage of the Software Payload if the Tracker Server program is programmed for unauthorized copy-rejection, or (ii) the Copy field is used to count the number of unauthorized copies if the Tracker Server program is programmed to permit access to the Software Payload by an unauthorized copy; and the Copy field is initially set by the Tracker Server program, and contains the number of unauthorized copies known by the Tracker Server program if the Tracker Server program permits use of unauthorized copies.

13. The method of claim 12 wherein the Current Token further includes a Base Serial Number which comprises a plurality of fields including Customer number, Batch number, Sequence number and Check digits represented by:

$$customer{:}W{-}batch{:}X{-}sequence{:}Y{-}check{:}Z;$$

wherein W, X, Y and Z are numbers; and wherein abbreviations and compression are optionally used.

14. The method of claim 1 wherein the Software Payload is a software program and/or electronic data.

15. The method of claim 1 wherein a list of authorized Base Serial Numbers is stored in the Tracker Server database, and wherein the Base Serial Number of each incoming Current Token is compared with this list and if not found therein the Current Token is considered invalid.

16. A system for copy-tracking distributed software programs over a computer network after the programs are distributed to users comprising:

a plurality of a distributable computer-readable media encoded with (1) a Software Payload to be tracked, (2) a Tracker Client program and (3) a Current Token readable by the Tracker Client program and including a Key field and a Usage field;

a central computer in the network, the central computer having installed thereon a Tracker Server program including a database for storing Current Tokens received from the Tracker Client programs;

a plurality of user computers connectable to the network, each one of the user computers having operatively associated therewith one of the encoded computer-readable media;

a plurality of means each including one of the user computers for executing the Tracker Client program on the encoded medium operatively associated therewith:

(a) to access the Tracker Server program on the central computer via computer-to-computer communications over the network;

(b) to read the Current Token on the encoded medium operatively associated therewith and to send the Current Token to the Tracker Server program; and (c) to execute the Software Payload whenever the Tracker Client program receives an indication from the Tracker Server program to permit execution of the Software Payload; and means including the central computer for executing the Tracker Server program:

(d) to validate each Current Token sent thereto; and if the Current Token is invalid the Tracker Server program is executed to request a re-send or to inform the Tracker Client program to prevent access to the Software Payload;

(e) if the Tracker Server program validates the Current Token in step (d) and the Usage field is set to zero to indicate that the Tracker Client program is initially communicating with the Tracker Server program, the Tracker Server program is executed by the central computer (1) to return a new Current Token with a new Key in the Key field to the Tracker Client program for use when the Tracker Client program next accesses the Tracker Server program, (2) to store at least the Key of the new Current Token in the Tracker Server database, (3) to set the Usage field to one, and (4) to indicate to the Tracker Client program to permit execution of the Software Payload; or (f) if the Tracker Server program validates the Current Token in step (d) and the Usage field is set to greater than zero to indicate that the Tracker Client program has previously communicated with the Tracker Server program, the Tracker Server program is executed by the central computer (1) to determine whether the Key in the Key field matches a Key in the Tracker Server database, and if there is a match, (2) to return a new Current Token with a new Key in the Key field to the Tracker Client program for use when the Tracker Client program next accesses the Tracker Server program, (3) to store at least the Key of the new Current Token in the Tracker Server database, (4) to increment the Usage field by one, and (5) to indicate to the Tracker Client program to permit execution of the Software Payload; and if in (1) above the Key in the Key field does not match a Key in the Tracker Server database, optionally informing the Tracker Client program to prevent access to the Software Payload.

17. The system of claim 16 wherein initially the Current Token of each distributable medium includes a Base Serial Number field with a Base Serial Number therein and an empty Key field;

when the Tracker Client program first communicates the Current Token to the Tracker Server program, the central computer executes the Tracker Server program to search the Tracker Server database to confirm that the Base Serial Number has not been previously received, and the Tracker Server program creates a unique Key and places the Key in the Key field of the Current Token to form the new Current Token;

the Tracker Server program also stores the new Current Token including the Base Serial Number and the created Key in the Tracker Server database; and thereafter when the Tracker Server program receives a Current Token with a Base Serial Number and Key that match the stored Base Serial Number and the created Key, the Tracker Server program creates a new Key and stores the new key in the Tracker Server database, and returns a new Current Token with the new Key to the Tracker Client along with permission to execute the Software Payload; or thereafter when the Tracker Server program receives a Current Token having a Base Serial Number and a Key from a Tracker Client, and the Key does not match the Key associated with the Base Serial Number stored in the Tracker Server database, then an unauthorized copy has been detected, and optionally the Tracker Server program sends the Tracker Client program an instruction refusing permission to execute the Software Payload.

18. A computer-readable medium for use in a system for copy-tracking distributed software programs over a computer network after the programs are distributed to users comprising:

the computer-readable medium having encoded thereon (i) a Software Payload to be tracked, (ii) a Tracker Client program and (iii) a Current Token readable by the Tracker Client program, said Current Token including a key field and a usage field;

the Tracker Client program being computer executable to interact with a remote Tracker Server program executable by a central computer on the network for copy-tracking the distributed medium, the Tracker Server program maintaining a database of Current Tokens received from the Tracker Client (TC) program and other TC programs that are executable by computers on the network, the database being used for validating Current Tokens received from the TC programs;

the computer-readable media being encoded with the following computer executable Tracker Client program instructions:

(a) to access the Tracker Server program on the central computer via computer-to-computer communications over the network;

(b) to read the Current Token on the computer-readable medium and to send the Current Token to the Tracker Server program;

(c) when the Tracker Server program validates the Current Token for execution of the Software Payload, to store a new Current Token received from the Tracker Server program for use when the Tracker Client program next accesses the Tracker Server program, the new Current Token including a new Key in the Key field and an incremental increase in the Usage field; and (d) to execute the Software Payload whenever the Tracker Client program receives an authorization from the Tracker Server program for execution of the Software Payload, or to deny access to the Software Payload whenever the Tracker Client program receives an instruction from the Tracker Server program refusing permission to execute the Software Payload.

19. The computer-readable medium of claim 18 wherein initially the Current Token of each distributable medium includes a Base Serial Number field with a Base Serial Number therein.

20. A method of copy-tracking distributed Software Payloads over a computer network after the Software Payloads are distributed to users comprising the steps of:

(a) selectively distributing a plurality of Software Payloads encoded with a Tracker Client program and a Current Token readable by the Tracker Client program and including a Key field and a Usage field;

(b) installing a Tracker Server program on a central computer in the network, the Tracker Server program including a database for storing Current Tokens received from the Tracker Client programs;

(c) installing the distributed Software Payloads on respective user computers that are connectable to the network;

(d) operating each one of the user computers to execute the Tracker Client program on the distributed Software Payload installed thereon to access the Tracker Server program on the central computer via computer-to-computer communications over the network;

(e) the user computer of step (d) executing the Tracker Client program to read the Current Token on the distributed Software Payload installed thereon and to send the Current Token to the Tracker Server program;

(f) the central computer executing the Tracker Server program to validate the Current Token of step (e); if the Current Token is invalid the Tracker Server program is executed to request a re-send or to inform the Tracker Client program to prevent access to the Software Payload;

(g) if the Tracker Server program validates the Current Token in step (f) and the Usage field is set to zero to indicate that the Tracker Client program is initially communicating with the Tracker Server program, the Tracker Server program is executed by the central computer (1) to return a new Current Token with a new Key in the Key field to the Tracker Client program for use when the Tracker Client program next accesses the Tracker Server program, (2) to store at least the Key of the new Current Token in the Tracker Server database, (3) to set the Usage field to one, and (4) to indicate to the Tracker Client program to permit execution of the Software Payload; or (h) if the Tracker Server program validates the Current Token in step (f) and the Usage field is set to greater than zero to indicate that the Tracker Client program has previously communicated with the Tracker Server program, the Tracker Server program is executed by the central computer (1) to determine whether the Key in the Key field matches a Key in the Tracker Server database, and if there is a match, (2) to return a new Current Token with a new Key in the Key field to the Tracker Client program for use when the Tracker Client program next accesses the Tracker Server program, (3) to store at least the Key of the new Current Token in the Tracker Server database, (4) to increment the Usage field by one, and (5) to indicate to the Tracker Client program to permit execution of the Software Payload; and if in (1) above the Key in the Key field does not match a Key in the Tracker Server database, optionally informing the Tracker Client program to prevent access to the Software Payload; and (i) repeating steps (d) to (h) for the other user computers.

21. The method of claim 20 wherein the Software Payloads are electronically-deliverable.

22. The method of claim 21 wherein in step (h) the Tracker Server program instructs the Tracker Client program to prevent access to the Software Payload whenever the Key in the Current Token does not match a Key in the Tracker Server database, and the Tracker Client program is executed by the user computer to prevent such access.

23. The method of claim 21 further comprising the user computer executing the Software Payload whenever the Tracker Client program receives an indication from the Tracker Server program to permit execution of the Software Payload.

24. The method of claim 21 wherein in step (h) a copy the Tracker Client program is detected when a Key in the Key field does not match a Key in the Tracker Server database, and wherein the Tracker Server program increments a database for recording a current number of copies detected for the respective Current Token.

25. The method of claim 21, wherein the Keys are each unique characters formed of randomly generated numbers and/or letters.

26. The method of claim 21 wherein initially the Current Token of each electronically-distributable Software Payload includes a Base Serial Number field with a Base Serial Number therein and an empty Key field;

when the Tracker Client program first communicates the Current Token to the Tracker Server program, the Tracker Server program searches the Tracker Server database to confirm that the Base Serial Number has not been previously received, and the Tracker Server program creates a unique Key and places the Key in the Key field of the Current Token to form the new Current Token;

the Tracker Server program also stores the new Current Token including the Base Serial Number and the created Key; and thereafter when the Tracker Server program receives a Current Token with a Base Serial Number and Key that match the stored Base Serial Number and the created Key, the Tracker Server program creates a new Key and stores the new key in the Tracker Server database, and returns a new Current Token with the new Key to the Tracker Client along with permission to execute the Software Payload.

27. The method of claim 21 wherein the Current Token of each electronically-distributable Software Payload includes a Base Serial Number and a Key, and wherein if the Tracker Server program receives a Current Token having a Base Serial Number and a Key from a Tracker Client, and the Key does not match the Key associated with the Base Serial Number stored in the Tracker Server database, then an unauthorized copy has been detected, and optionally the Tracker Server program sends the Tracker Client program an instruction refusing permission to execute the Software Payload.

28. The method of claim 27 wherein the Tracker Server program sends the Tracker Client program an instruction refusing permission to execute the Software Payload.

29. The method of claim 21 wherein initially the Current Token of each electronically-distributable Software Payload includes as the unique component an empty Base Serial Number field and an empty Key field;

when the Tracker Client program first communicates the Current Token to the Tracker Server program, the Tracker Server program recognizes the empty Base Serial Number field and the empty Key field and advances to step (g) wherein the Tracker Server program places a distinctive Base Serial Number in the Base Serial Number field and creates a unique Key and placing the unique Key in the Key field of the Current Token to form the new Current Token, and the new Current Token is returned to the Tracker Client program with permission to execute the Software Payload;

the Tracker Server program also stores the new Current Token including the distinctive Base Serial Number and the created Key in the Tracker Server database; and thereafter whenever the Tracker Server program receives a Current Token with a Serial Number and a Key that match the stored distinctive Base Serial Number and the created Key, the Tracker Server program creates a new Key and stores the new key in the Tracker Server database, and returns a new Current Token with the new Key to the Tracker Client program along with permission to execute the Software Payload.

30. The method of claim 21 wherein in step (a) the Current Token further includes a Base Serial Number in an unchangeable Base Serial Number field.

31. The method of claim 21 wherein the the electronically-deliverable Software Payloads along with the Tracker Client program and Current Token are created by a strict duplication method which makes only identical copies in batches with all copies in each batch having a common batch Base Serial Number, and wherein initially the Current Token of each electronically-deliverable software in the batch includes a Base Serial Number field with the common Base Serial Number therein and an empty Key field;

when the Tracker Client program first communicates the Current Token of each one of the distributable computer-readable media to the Tracker Server program, the Tracker Server program searches the Tracker Server database to confirm that the common Base Serial Number is authorized, and the Tracker Server program changes the component of the Current Token by creating a unique Key and placing the Key in the Key field of the Current Token to form the new Current Token;

the Tracker Server program also stores the new Current Token including the common Base Serial Number and the created Key; and thereafter when the Tracker Server program receives a Current Token with a Base Serial Number and Key that match the stored common Base Serial Number and the created Key, the Tracker Server program creates a new Key and stores the new key in the Tracker Server database, and returns a new Current Token with the new Key to the Tracker Client along with permission to execute the Software Payload.

32. The method of claim 21 wherein the Current Token comprises a plurality of fields including Key, Copy and Usage represented by:

Key:00-Copy:0-Usage:0 in which:

the Usage field tracks the number of times the Tracker Client program is used, the Key is formed of unique characters created by the Tracker Server program for the Current Token and is also stored in the Tracker Server database, and functions to validate uses of the Current Token subsequent to the first time the Tracker Client program and Tracker Server program communicate, wherein if the Tracker Client program presents an invalid Key to the Tracker Server program (i) the Tracker Server program will reject the invalid Key and inform the Tracker Client program to disallow usage of the Software Payload if the Tracker Server program is programmed for unauthorized copy-rejection, or (ii) the Copy field is used to count the number of unauthorized copies if the Tracker Server program is programmed to permit access to the Software Payload by an unauthorized copy; and the Copy field is initially set by the Tracker Server program, and contains the number of unauthorized copies known by the Tracker Server program if the Tracker Server program permits use of unauthorized copies.

33. The method of claim 32 wherein the Current Token further includes a Base Serial Number which comprises a plurality of fields including Customer number, Batch number, Sequence number and Check digits represented by:

customer:W-batch:X-sequence:Y-check:Z;

wherein W, X, Y and Z are numbers; and wherein abbreviations and compression are optionally used.

34. The method of claim 21 wherein the Software Payload is a software program and/or electronic data.

35. The method of claim 21 wherein a list of authorized Base Serial Numbers is stored in the Tracker Server database, and wherein the Base Serial Number of each incoming Current Token is compared with this list and if not found therein the Current Token is considered invalid.

36. A system for copy-tracking distributed software programs over a computer network after the programs are distributed to users comprising:

a plurality of electronically-distributable Software Payloads encoded with a Tracker Client program and a Current Token readable by the Tracker Client program and including a Key field and a Usage field;

a central computer in the network, the central computer having installed thereon a Tracker Server program including a database for storing Current Tokens received from the Tracker Client programs;

a plurality of user computers connectable to the network, each one of the user computers having operatively associated therewith one of the encoded computer-readable media;

a plurality of means each including one of the user computers for executing the Tracker Client program on the encoded medium operatively associated therewith:

(a) to access the Tracker Server program on the central computer via computer-to-computer communications over the network;

(b) to read the Current Token on the encoded medium operatively associated therewith and to send the Current Token to the Tracker Server program; and (c) to execute the Software Payload whenever the Tracker Client program receives an indication from the Tracker Server program to permit execution of the Software Payload; and means including the central computer for executing the Tracker Server program:

(d) to validate each Current Token sent thereto; and if the Current Token is invalid the Tracker Server program is executed to request a re-send or to inform the Tracker Client program to prevent access to the Software Payload;

(e) if the Tracker Server program validates the Current Token in step (d) and the Usage field is set to zero to indicate that the Tracker Client program is initially communicating with the Tracker Server program, the Tracker Server program is executed by the central computer (1) to return a new Current Token with a new Key in the Key field to the Tracker Client program for use when the Tracker Client program next accesses the Tracker Server program, (2) to store at least the Key of the new Current Token in the Tracker Server database, (3) to set the Usage field to one, and (4) to indicate to the Tracker Client program to permit execution of the Software Payload; or (f) if the Tracker Server program validates the Current Token in step (d) and the Usage field is set to greater than zero to indicate that the Tracker Client program has previously communicated with the Tracker Server program, the Tracker Server program is executed by the central computer (1) to determine whether the Key in the Key field matches a Key in the Tracker Server database, and if there is a match, (2) to return a new Current Token with a new Key in the Key field to the Tracker Client program for use when the Tracker Client program next accesses the Tracker Server program, (3) to store at least the Key of the new Current Token in the Tracker Server database, (4) to increment the Usage field by one, and (5) to indicate to the Tracker Client program to permit execution of the Software Payload; and if in (1) above the Key in the Key field does not match a Key in the Tracker Server database, optionally informing the Tracker Client program to prevent access to the Software Payload.

37. The system of claim 36 wherein initially the Current Token of each electronically-distributable Software Payload includes a Base Serial Number field with a Base Serial Number therein and an empty Key field;

when the Tracker Client program first communicates the Current Token to the Tracker Server program, the central computer executes the Tracker Server program to search the Tracker Server database to confirm that the Base Serial Number has not been previously received, and the Tracker Server program creates a unique Key and places the Key in the Key field of the Current Token to form the new Current Token;

the Tracker Server program also stores the new Current Token including the Base Serial Number and the created Key in the Tracker Server database; and thereafter when the Tracker Server program receives a Current Token with a Base Serial Number and Key that match the stored Base Serial Number and the created Key, the Tracker Server program creates a new Key and stores the new key in the Tracker Server database, and returns a new Current Token with the new Key to the Tracker Client along with permission to execute the Software Payload; or thereafter when the Tracker Server program receives a Current Token having a Base Serial Number and a Key from a Tracker Client, and the Key does not match the Key associated with the Base Serial Number stored in the Tracker Server database, then an unauthorized copy has been detected, and optionally the Tracker Server program sends the Tracker Client program an instruction refusing permission to execute the Software Payload.

38. A electronically-distributable Software Payload for use in a system for copy-tracking electronically-distributable Software Payloads over a computer network after the programs are distributed to users comprising:

the electronically-distributable Software Payload having encoded thereon (i) a Software Payload to be tracked, (ii) a Tracker Client program and (iii) a Current Token readable by the Tracker Client program, said Current Token including a key field and a usage field;

the Tracker Client program being computer executable to interact with a remote Tracker Server program executable by a central computer on the network for copy-tracking the distributed medium, the Tracker Server program maintaining a database of Current Tokens received from the Tracker Client (TC) program and other TC programs that are executable by computers on the network, the database being used for validating Current Tokens received from the TC programs;

the electronically-distributable Software Payload being encoded with the following computer executable Tracker Client program instructions:

(a) to access the Tracker Server program on the central computer via computer-to-computer communications over the network;

(b) to read the Current Token on the computer-readable medium and to send the Current Token to the Tracker Server program;

(c) when the Tracker Server program validates the Current Token for execution of the electronically-distributable Software Payload, to store a new Current Token received from the Tracker Server program for use when the Tracker Client program next accesses the Tracker Server program, the new Current Token including a new Key in the Key field and an incremental increase in the Usage field; and (d) to execute the electronically-distributable Software Payload whenever the Tracker Client program receives an authorization from the Tracker Server program for execution of the Software Payload, or to deny access to the Software Payload whenever the Tracker Client program receives an instruction from the Tracker Server program refusing permission to execute the Software Payload.

39. The electronically-distributable software Payload of claim 38 wherein initially the Current Token of each electronically-distributable Software Payload includes a Base Serial Number field with a Base Serial Number therein.

* * * * *